United States Patent [19]

Phelps

[11] 4,114,404

[45] Sep. 19, 1978

[54] UNIVERSAL JOINT

[75] Inventor: Orville E. Phelps, Sylvania, Ohio

[73] Assignee: Dana Corporation, Toledo, Ohio

[21] Appl. No.: 793,206

[22] Filed: May 2, 1977

[51] Int. Cl.² ............................ F16D 3/30; F16D 3/28
[52] U.S. Cl. ........................................ 64/17 A; 64/21
[58] Field of Search ............................. 64/21, 17 A, 8

[56] References Cited

U.S. PATENT DOCUMENTS

| Re. 26,691 | 10/1969 | Sharp | 64/21 |
|---|---|---|---|
| 2,270,281 | 1/1942 | Dunn | 64/17 A |
| 2,427,449 | 9/1947 | Dunn | 64/17 A |
| 2,902,844 | 9/1959 | Rzeppa | 64/21 |
| 3,008,311 | 11/1961 | Mazziotti | 64/8 |
| 3,187,520 | 6/1965 | Rzeppa | 64/21 |
| 3,332,256 | 7/1967 | Mazziotti | 64/21 |
| 3,333,440 | 8/1967 | Sharp | 64/21 |
| 3,520,152 | 7/1970 | Schmid | 64/21 |
| 3,748,869 | 7/1973 | Orain | 64/17 A |

FOREIGN PATENT DOCUMENTS 2,234,236  7/1973  Fed. Rep. of Germany ......... 64/17 A Primary Examiner—Benjamin W. Wyche
Assistant Examiner—R. C. Turner
Attorney, Agent, or Firm—Robert M. Leonardi

[57] ABSTRACT

Two rotatable shafts are drivingly connected by a torque transmitting mechanism. Each shaft has a groove, the grooves being disposed in a cooperative paired relationship. The grooves are adapted to at least partially contain the torque mechanism. A bearing assembly may be provided to assist relative movement between the torque transmitting mechanism and one of the grooves. The torque transmitting mechanism may be circumferentially spaced at least about 180° from the next adjacent torque transmitting mechanism.

11 Claims, 3 Drawing Figures

UNIVERSAL JOINT

BACKGROUND OF THE INVENTION

This invention relates to universal joints and more particularly to universal joints which provide a substantially constant velocity transfer of rotary motion.

Many types and designs of substantially constant velocity universal joints are well known. However, the majority of these designs are not satisfactory from a cost, production and/or serviceability standpoint and many contain rather complex means for providing constant velocity.

The universal joint design disclosed in U.S. Pat. No. 3,332,256 issued to Phillip J. Mazziotti and assigned to the assignee of the present invention, alleviates many of these problems. The aforementioned patent to Mazziotti discloses a universal joint having four equally circumferentially spaced rollers which collectively transmit torque from an inner rotatable member to an outer rotatable member. Each roller has a pilot means rotatable and pivotable within a generally elliptical bore in a groove in the inner rotatable member. Each roller also has an inner portion rotatably positioned in an axially extending groove in the inner rotatable member and an outer portion rotatably positioned in an axially extending groove in the outer rotatable member. When the joint telescopes, or when the rotatable members are disposed at an angle relative to each other and the joint is rotated, the outer portion of each roller oscillates axially within its respective groove in the outer rotatable member. In this design the geometry and cooperation of the various components of the joint are relied upon to achieve a substantially constant velocity transfer of rotary motion.

The geometry of the previously described universal joint has succeeded to a great extent in coordinating the components thereof. However, it has been found that the efficiency of the joint may be diminished by internal forces such as friction and/or binding between the components of the joint. For example, friction between the pilot means and its associated bore and between the inner portion of the roller and the groove in the inner rotatable member will oppose rotation of the rollers, thereby opposing telescoping rotating of the joint. As a result, the rollers have a tendency to slide axially rather than roll within the grooves of the outer member. This sliding creates additional friction between the outer surface of the rollers and the sides of the grooves in the outer rotatable member in which they axially oscillate.

Another problem encountered in the operation of a universal joint of the aforementioned design is binding of the torque transmitting rollers. It is desirable for smooth operation of the joint to maintain minimum machining tolerances of the joint components. This assures a smooth transfer of torque through the joint. However, the close tolerances can create problems with respect to alignment and cooperation of the roller carrying grooves of the inner and outer members. Index error between the grooves may lead to a binding of the rollers during the rotation of the joint. For example, consider the aforementioned universal joint design in which the inner and outer members each have four grooves nominally circumferentially spaced 90° from each other. Also consider that one of the grooves in the inner member, due to a small machining error, is out of position with respect to the other grooves, by 0.1°, such that is is spaced 89.9° and 90.1°, respectively, from the next adjacent grooves. During operation of this joint, the rollers may bind because the inner member cannot center itself within the outer member. Furthermore, the inner member cannot assume a position of equal load distribution between the rollers. As a result, the rollers will fight or oppose each other during rotation of the joint, creating a situation in which the rollers may bind against either the inner or outer member. Misalignment of the grooves may cause similar problems.

It should also be noted that the aforementioned design does not produce a truly "constant velocity" for all angles between the two rotatable members, as is described in detail in U.S. Pat. No. 3,332,256. As explained in that patent, the four rollers cannot always be disposed on the "bisecting plane" between the inner and outer rotatable members. As the joint rotates, the rollers will be disposed at locations unequally spaced from the bisecting plane and will carry unequal loads. Again, the rollers therefore inherently tend to oppose or fight the internal movement of each other, resulting in reduced effeciency of the joint.

In practice, to reduce the efficiency losses due to internal friction and binding of the universal joint components, additional internal clearances between the components have been provided in the joint. This has not proved to be an entirely satisfactory solution. Oversized clearances can cause a chattering or clattering of the rollers against the other joint components. This chattering is due in part from the inertial loading of the components as the joint rotates. Inertial loading may result in erradic operation of the joint and may cause a more rapid wear of the joint components.

SUMMARY OF THE INVENTION

It is an object of this invention to provide a universal joint which will transfer rotary motion at a substantially constant velocity.

It is a further object of this invention to provide a universal joint having increased efficiency.

These and other objects of the present invention which will become apparent from the following detailed description are achieved by a universal joint having first and a second rotatable members, the first member having a torque element receiving means and the second member having a pilot receiving means disposed in a cooperative paired relationship with the torque element receiving means. A torque transmitting mechanism having a torque element disposed at one of its ends is adapted for movement within the torque element receiving means. A pilot is disposed at another end of the torque transmitting device and is adapted for pivotal engagement with the pilot receiving means. In a preferred embodiment the torque transmitting device is circumferentially spaced at least about 180 degrees from the next adjacent torque transmitting mechanism. In another preferred embodiment the joint includes a bearing assembly comprising a bearing race disposed partially within the torque element receiving means. The bearing race is adapted to partially contain the torque element and may have a plurality of needle bearings and thrust bearings in contact with the torque element.

DETAILED DESCRIPTION OF A PRESENTLY PREFERRED EMBODIMENT

Figures 1, 2, 3:
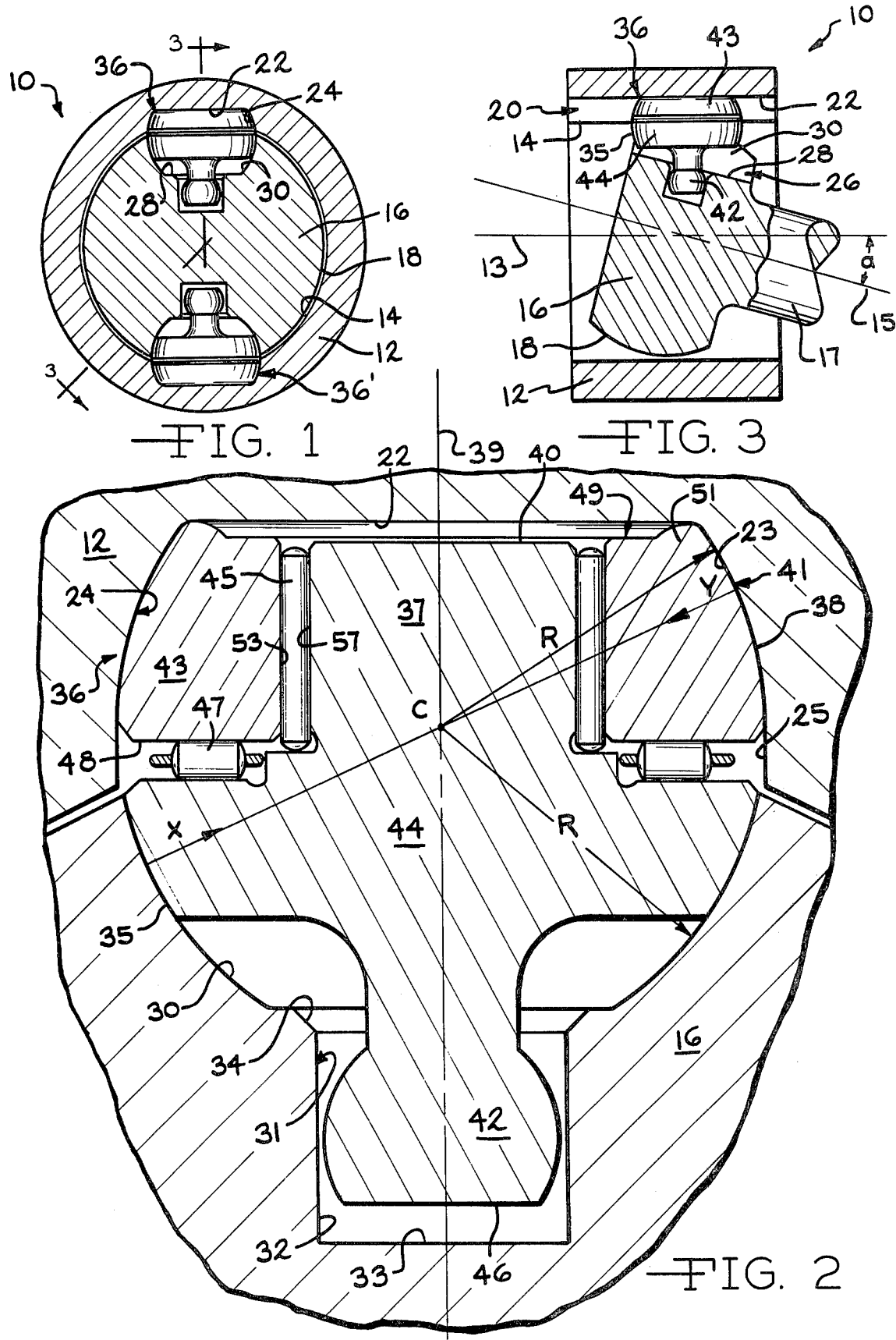
FIG. 1 is a partially cross sectioned view of the universal joint of the present invention taken in a plane normal to the axis of rotation thereof.
FIG. 2 is an enlarged sectional view of a portion of the universal joint of FIG. 1.
FIG. 3 is a sectional view of the universal joint of FIG. 1 taken along line 3—3 of FIG. 1.

Referring to FIGS. 1, 2 and 3, a universal joint 10 includes a pair of cooperatively disposed torque transferring members. The first or outer member 12 is a cylinder having an axis of rotation 13 and a central axial bore 14. The second or inner member 16 is disposed within the central bore 14 of the outer member 12 and has an axis of rotation 15. The members 12 and 16 are disposed in a cooperative relationship at an angle "a" relative to each other. The inner member 16 has a generally spherical surface 18 with an outside diameter less than the inside diameter of the outer member 12, thereby permitting relative movement between the outer and inner members. The inner member 16 is provided with a shaft extension 17 for conventional attachment to a drive train. The outer member 12 may also be suitably secured to a drive train.

The outer member 12 is provided with two axially extending torque element receiving means 20 in the form of grooves. The grooves 20 are disposed within the bore 14 and are circumferentially equally spaced within the bore 14. The radially outer portion or bottom 22 of each of the grooves 20 is preferably flat as illustrated and is disposed in a plane parallel to the axis of rotation 13 of the outer member 12. The side walls 24 of the grooves 20 have upper portions 23 formed arcuately, with the two upper portions 23 of each groove 20 having radius R and a common center C. In this preferred embodiment the axially extending locus of such center C is parallel to the axis of rotation 13 of the outer member 12 and is disposed at a radial distance from the axis 13 approximately equal to the radius of the bore 14. The lower portions 25 of the side walls 24 have a larger radius than the upper portions 23 and therefore have a flatter surface.

The spherical surface 18 of the inner member 16 is axially truncated and is interrupted at circumferentially equal spaced intervals by axially extending receiving means in the form of grooves 26. When the members 12 and 16 are coaxial, each of the grooves 26 is in a paired, aligned and radially spaced relationship with one of the grooves 20. The radially inner portion or bottom 28 of each of the grooves 26 is preferably flat and extends parallel to the axis of rotation 15 of the inner member 16. When the members 12 and 16 are coaxial, the bottoms 28 and 22 of paired grooves are radially spaced and parallel. The side walls 30 of the grooves 26 are arcuate and are concentric with the upper portions 23 of the walls 24 of the outer member 12. The side walls 30 have a radius R equal to the radius of the upper portions 23. Medially disposed in the bottom of each of the grooves 26 is a radially extending, generally elliptical, bore 31 having side wall portions 32 and a bottom portion 33. The central axis of bore 31 is perpendicular to the axis of rotation of the inner member 16. The radially outer portion of the bore 31 is chamfered as shown at 34.

Disposed within each pair of registering grooves 20 and 26 is a torque transmitting mechanism 36 or 36'. The two torque mechanisms 36 and 36' are identical and are circumferentially spaced 180° from each other. The torque mechanism 36, which can most clearly be seen in FIG. 2, is symmetrical about a longitudinal axis 39 and has a central core or hub 44. The hub 44 has a truncated spherical periphery 35 in driving engagement with the walls 30 of the grooves 26. The peripheral surface 35 conforms with the wall 30 and has a relatively tight fit within the groove 26. Integral with the hub 44 and disposed at the radially outer end of the axis 39 is a torque element 37 having a generally cylindrical configuration. The torque element 37 has a flat radially outer or top surface 40 spaced from the flat bottom 22 of the groove 20.

A bearing assembly 41 is rotatably disposed about the torque element 37. The assembly 41 includes an annular bearing race or sleeve 43 concentric with the cylindrical torque element 37. Rotatably disposed between the radially inner surface or inner race 53 of the bearing race 43 and the radially outer surface 57 of the torque element 37 are a plurality of needle bearings 45. The needle bearings 45 are equally circumferentially spaced around the torque element 37 and are parallel to the axis 39 of the torque mechanism 36. A plurality of thrust bearings 47 are rotatably disposed between the hub 44 and the bottom or lower surface 48 of the bearing race 43. Each thrust bearing 47 extends radially with respect to the axis 39 of the torque mechanism 36 and lies in a plane perpendicular to the axis 39. It should be noted that in universal joints for use in low load carrying capacities, low friction bushings of materials such as nylon, teflon or oil impregnated metals, may be substituted for the needle or thrust bearings of the presently preferred embodiment.

The bearing race 43 has a peripheral surface 38 of a truncated, generally spherical configuration which conforms with the walls 24 of the groove 20. However, the spherical surface 38 has a clearance of about 0.001 inch with the walls 24, thereby permitting rotation of the bearing race within the groove 20. In this preferred embodiment, the top or upper surface 49 of the bearing race includes an annular ridge 51 extending around its periphery and in contact with the bottom surface 22 of the groove 20. The ridges 51 provides for a spacing between the outer surface 49 and the bottom 22 of the groove 20, thereby reducing frictional resistance to relative movement between the torque transmitting mechanism and the outer member 12.

A pilot 42 is disposed on the radially inner portion of the hub 44 and is integral therewith. The pilot has a truncated spherical configuration having a flat radially inner surface 46. The pilot 42 extends into the bore 31 in the bottom of the groove 26 with the flat surface 46 being spaced from the bottom 33 of the bore 31. Viewed normal to the axis 39, the bore 31 has a generally elliptical cross section sized to accommodate a relatively tight fit with the pilot 42. It should be noted that any clearance required between the pilot 42 and the bore 31 is to facilitate a pivoting of the pilot 42. A larger clearance as heretofore used to accommodate rotation of the pilot as well as a pivoting is not required.

As can be seen in FIG. 3, the arrangement of the various components of the joint 10 allows the outer and inner rotatable members 12 and 16 to move angularly with respect to each other. During such angular movement the ridge 51 remains in full contact engagement with the bottom 22 of the groove 20, the hub 44 and the torque element 37 remain in full contact engagement with the bearing assembly 41 and the pilot 42 pivots relative to the inner member 16.

The groove 26 in the inner member 16 extends radially inwardly an amount greater than the radial extent of the spherical surface 35 of the torque mechanism 36.

Substantial angular movement between the inner and outer members may therefore be accommodated before an interfering engagement between the torque mechanism and the bottom 28 of the groove 26 occurs. As viewed in FIG. 3, as the inner member is rotated clockwise relative to the outer member and the angle "a" is increased, the left end of the groove 26 radially approaches or converges with the groove 20. Simultaneously, the right end of the groove 26 diverges from the groove 20. Additionally, the bore 31, in moving clockwise in an arcuate manner with the inner member 16, carries the pilot 42 and thus the entire torque mechanism 36 axially to the right. Because the inner member 16 is moving arcuately while the roller is moving axially, the pilot 42 moves slightly out of the bore 31. Such outward movement does not interfere with the axial engagement of the bore 31 and pilot 42 as a result of their pivotal engagement. During telescoping of the joint, the torque mechanism 36 moves axially unitarily with the inner member 16 relative to the outer member 12.

In one mode of operation of the universal joint 10, the inner member 16 is rotatably driven by a suitable source of power. Torque is transferred from the wall 30 of the groove 26 to the surface 35 of the hub 44. The torque is then transferred by the torque element 37 and the bearing race 43 to the outer member 12, causing rotation of member 12. If the members 12 and 16 are disposed an angle "a" relative to each other, the torque mechanism 36 axially oscillates one cycle for each complete revolution of the members 12 and 16. As the member 12 rotates, the frictional force between a wall 24 of the groove 20 and the outer peripheral surface 38 of the bearing race 43 inhibits sliding of the bearing race in the groove. Axial oscillation of the torque mechanism 36 thereby causes the bearing race to roll against a wall 24 of the groove 20. The 0.001 inch approximate clearance between the bearing race 43 and the wall 24 is sufficient to permit rolling of the bearing race. An additional clearance between the bearing race and the wall 24 of between about 0.0001 inches and 0.0005 inches, depending upon the load applied, may occur due to deformation of the bearing race 43 or the wall 24 under loading. The hub 44 and the torque element 37 will be held rotatively stationary by the friction between the pilot 42 and the bore 31 and between the surface 35 of the hub and the surface 30 of the groove 26.

Only the ridge 51 of the bearing race 43 as it slides against the bottom 22 of the groove 20 will frictionally oppose rotation of the bearing race. However, because of the geometry of the joint, the load applied to the bearing race against the bottom 22 of the groove 20 is relatively small in most applications and the resulting friction is therefore negligible. In an ideal situation with the joint angle "a" equal to zero, the resultant force vector "X" applied by the inner groove 30 to the surface 35 of the torque mechanism 36 passes through the center C of the mechanism. Furthermore, the reaction force vector "Y" of the outer groove 24 against the surface 38 of the bearing race 43 also passes through the center C. Therefore with a zero joint angle there are no forces that can promote a twisting of the torque mechanism 36 about its center, which would tend to imbed a portion of the ridge 51 into the bottom 22 of the outer member groove 20. As the joint angle "a" increases the force vectors "X" and "Y" have a tendency to change direction relative to the center C and may therefore create twisting forces and increase friction between the ridge 51 and the groove 20. In axially friction sensitive applications, it is possible to reduce any resulting friction. For example, a low friction thrust washer may be inserted between the ridge 51 and the bottom 22 of the groove 20, or a special low friction coating, such as a plastic coating, may be applied to either the ridge 51 or the surface 22. Furthermore, the ridge 51 can be completely eliminated from the bearing race 43, with the race being maintained in a spaced relationship from the bottom of the groove 22 by the geometry of the groove 24 and the cap surface 38.

In prior art devices of this type in which excessive friction between the torque transmitting rollers causes rapid wearing of the joint, it is desirable to reduce the amplitude or length of oscillation of the rollers. This amplitude is obviously dependent upon the size of the angle at which the rotatable members are disposed and upon the diameter of the outer member. In some applications it is difficult to reduce the angle between the rotatable joint members. If the diameter of the joint is decreased, the amplitude of the rollers is decreased but the load applied to each roller is increased and a greater number of rollers may be required to adequately distribute the load being transmitted through the joint. However, another problem emerges as the number of rollers in the joint increases. As described in U.S. Pat. No. 3,332,256 this type of universal joint is a truly constant velocity joint only when the rollers are disposed on the "bisecting plane" of the angle between the inner and outer rotatable members. When these rotatable members are disposed at an angle in which the rollers are not centered on the bisecting plane, the rollers will carry unequal loads because they cannot all be equally spaced from the bisecting plane at all operating positions. If there is a small index error or misalignment of the grooves, internal fight between the joint components and a resultant binding of the joint may occur. To reduce this internal fight, larger internal tolerances or clearances must be introduced. As previously discussed, this may result in clattering and inertial loading of the joint.

In the present invention, the bearing assembly 41 permits a greater amplitude of oscillation with only minimal wear of the torque transmitting mechanism 36 and the corresponding groove 20. A larger diameter joint can thereby be utilized to reduce the load on each torque mechanism. It follows that the number of torque mechanisms can then be reduced without reducing the torque transmitting capabilities of the joint beyond a minimum level. With only two torque transferring mechanisms 36 and 36' as in the presently preferred embodiment, the inner rotatable member 16 can more easily center itself with respect to the outer member 12, thereby accomodating any machining errors in the grooves 20 or 26 or in the torque mechanisms 36 or 36'. Furthermore, the inherent cooperation of two diametrically opposed torque mechanisms 36 and 36' increases efficiency of the joint. Because the torque mechanisms 36 and 36' are equally circumferentially spaced, they will always be disposed an equal distance from the "bisecting plane" and will therefore always carry an equal load. The joint will have reduced internal fight and reduced binding tendencies.

Because this invention alleviates binding or internal fight between the components of the joint and reduces internal friction thereof, the internal clearances or tolerances may be reduced. A tighter fit between joint components can thereby be achieved, reducing chattering and inertial loading and creating a smoother operating joint having better wear and efficiency characteristics.

Although the foregoing structure has been described for the purpose of illustrating a presently preferred embodiment of the invention, it should be understood that many modifications or alterations may be made without departing from the spirit and scope of the invention as set forth in the appended claims.

I claim:

1. In a universal joint comprising first and second rotatable members, each of said members having an axis of rotation, said rotatable members adapted to be disposed in a cooperative relationship in which said axes of rotation intersect at an angle, said first rotatable member having a torque element receiving means and said second rotatable member having a pilot receiving means disposed in a cooperative paired relationship with said torque element receiving means, a torque transmitting mechanism having a generally longitudinal axis, said mechanism comprising a torque element disposed at one end of said axis, said torque element disposed at least partially within said torque element receiving means and adapted for movement within said torque element receiving means, and a pilot disposed at another end of said axis, said pilot disposed at least partially within said pilot receiving means and adapted for pivotal engagement with said pilot receiving means, the improvement wherein said torque transmitting mechanism comprises a bearing assembly having a bearing race disposed at least partially within said torque element receiving means and drivingly engaged with said torque element receiving means, said bearing race at least partially containing said torque element.

2. A universal joint as defined in Claim 1 wherein said torque transmitting mechanism is circumferentially spaced at least about 180° from the next adjacent torque transmitting mechanism.

3. A universal joint as defined in claim 1 wherein said bearing race comprises a first plurality of bearings in rolling contact with said torque element.

4. A universal joint as defined in claim 3 wherein said first plurality of bearings are needle bearings disposed substantially normal to said axis of said first rotatable member and substantially parallel to said axis of said torque transmitting mechanism.

5. A universal joint as defined in claim 3 wherein said bearing assembly further comprises a second plurality of bearings in rolling contact with said torque transmitting mechanism.

6. A universal joint as defined in claim 5 wherein said second plurality of bearings are thrust bearings and wherein each of said thrust bearings extend substantially normal to each of said bearings of said first plurality and substantially radially to said axis of said torque element.

7. In a universal joint comprising first and second rotatable members, each of said members having an axis of rotation, said rotatable members adapted to be disposed in a cooperative relationship in which said axes of rotation intersect at an angle, said first rotatable member having a torque element receiving means and said second rotatable member having a pilot receiving means disposed in a cooperative paired relationship with said torque element means, a torque transmitting mechanism having a generally longitudinal axis, said mechanism comprising a torque element disposed at one end of said axis, said torque element disposed at least partially within said torque element receiving means and adapted for movement within said torque element receiving means, and a pilot disposed at another end of said axis, said pilot disposed at least partially within said pilot receiving means and adapted for pivotal engagement with said pilot receiving means, the improvement wherein said torque transmitting mechanism is circumferentially spaced at least about 180° from the next adjacent torque transmitting mechanism, said torque element receiving means of said first rotatable member comprises a groove, and said universal joint further comprises a bearing assembly having a bearing race disposed at least partially within said groove.

8. A universal joint as defined in claim 7 further comprising a second torque transmitting mechanism, said second mechanism circumferentially spaced about 180° from said torque transmitting mechanism.

9. A universal joint as defined in claim 7 wherein said groove comprises a bottom and side walls, and wherein said torque element is spaced from said bottom and side walls of said groove.

10. A universal joint as defined in claim 9 groove, wherein said bearing race drivingly engaged with said groove and at least partially containing said torque element.

11. A universal joint as defined in claim 10 wherein said bearing race comprises a top surface disposed adjacent said bottom portion of said groove, said top surface comprising a ridge in contact with said bottom portion.

* * * * *